United States Patent
Smith

(10) Patent No.: US 12,263,932 B2
(45) Date of Patent: Apr. 1, 2025

(54) AIRCRAFT WITH LIFTING BODY FUSELAGE PROFILE

(71) Applicant: Worrel Smith, Pembroke Pines, FL (US)

(72) Inventor: Worrel Smith, Pembroke Pines, FL (US)

(*) Notice: Subject to any disclaimer, the term of this patent is extended or adjusted under 35 U.S.C. 154(b) by 0 days.

(21) Appl. No.: 17/660,450

(22) Filed: Apr. 25, 2022

(65) Prior Publication Data
US 2023/0339592 A1 Oct. 26, 2023

(51) Int. Cl.
  B64C 1/00 (2006.01)
  B64C 39/10 (2006.01)

(52) U.S. Cl.
  CPC .... *B64C 1/0009* (2013.01); *B64C 2001/0045* (2013.01); *B64C 2039/105* (2013.01)

(58) Field of Classification Search
  CPC ...... B64C 2039/105; B64C 2001/0045; B64C 1/0009
  USPC .......................................................... 244/36
  See application file for complete search history.

(56) References Cited

U.S. PATENT DOCUMENTS

| | | | | |
|---|---|---|---|---|
| 1,843,678 A | * | 2/1932 | Jannin ........................ | B64C 3/14 244/36 |
| 2,561,291 A | * | 7/1951 | Rethorst ................. | B64C 37/00 244/50 |
| 3,869,102 A | | 3/1975 | Carroll | |
| 4,146,199 A | | 3/1979 | Wenzel | |
| 5,813,628 A | | 9/1998 | Hahl | |
| 5,823,468 A | | 10/1998 | Bothe | |
| 10,640,212 B1 | * | 5/2020 | Dizdarevic ............. | B64C 39/08 |
| 2007/0170309 A1 | | 7/2007 | Schafroth | |
| 2010/0252674 A1 | * | 10/2010 | Lang .................... | G05D 1/0653 701/3 |
| 2015/0122942 A1 | * | 5/2015 | Hirvinen ................... | B64C 3/14 244/36 |
| 2018/0170508 A1 | | 6/2018 | Bhatt | |

FOREIGN PATENT DOCUMENTS

WO WO-2018197956 A1 * 11/2018

* cited by examiner

*Primary Examiner* — Tien Q Dinh
*Assistant Examiner* — Katherine June Bolek
(74) *Attorney, Agent, or Firm* — Edison Law Group

(57) ABSTRACT

An aircraft with a lifting body fuselage profile having a nose end, tail end and having an upper surface between the nose and the tail end and a lower surface between the nose and the tail end. The profile of the upper surface having a section of a first ellipse starting at the nose end and a first circle arc transitioning from the first ellipse section to the tail end. The profile of the lower surface having a second circle arc transitioning from the section of the first ellipse of the upper surface at the nose end and transitioning to a straight line. The profile of the lower surface having a third circle arc transitioning from the straight line and a fourth circle arc transitioning from the third circle arc and ending at the tail end.

9 Claims, 2 Drawing Sheets

AIRCRAFT WITH LIFTING BODY FUSELAGE PROFILE

BACKGROUND

The present invention generally relates to aircraft. More specifically, the present invention relates to design of a fuselage acting as a lifting body that complements lift of the wings attached to the fuselage.

The aviation industry constantly strives to reduce take-off and landing distances, enhance glide ratio, improve fuel economy of aircraft designs. Another goal of the aviation industry is to deal with carrying unconventional freight. Currently, governments around the world are putting further restrictions on vehicles that use fossil fuel to reduce the carbon footprint of vehicles. With this in mind, aircraft with reduced take-off and landing distances, enhanced glide ratio, improved fuel economy are needed to replace current aircraft.

It is an object of the present invention to provide an aircraft with reduced take-off and landing distances, enhanced glide ratio, and improved fuel economy.

SUMMARY

An aircraft with a lifting body fuselage profile having a nose end, tail end and having an upper surface between the nose and the tail end and a lower surface between the nose and the tail end. The profile of the upper surface having a section of a first ellipse starting at the nose end and a first circle arc transitioning from the first ellipse section to the tail end. The profile of the lower surface having a second circle arc transitioning from the section of the first ellipse of the upper surface at the nose end and transitioning to a straight line. The profile of the lower surface having a third circle arc transitioning from the straight line and a fourth circle arc transitioning from the third circle arc and ending at the tail end.

DETAILED DESCRIPTION

Figure 1:
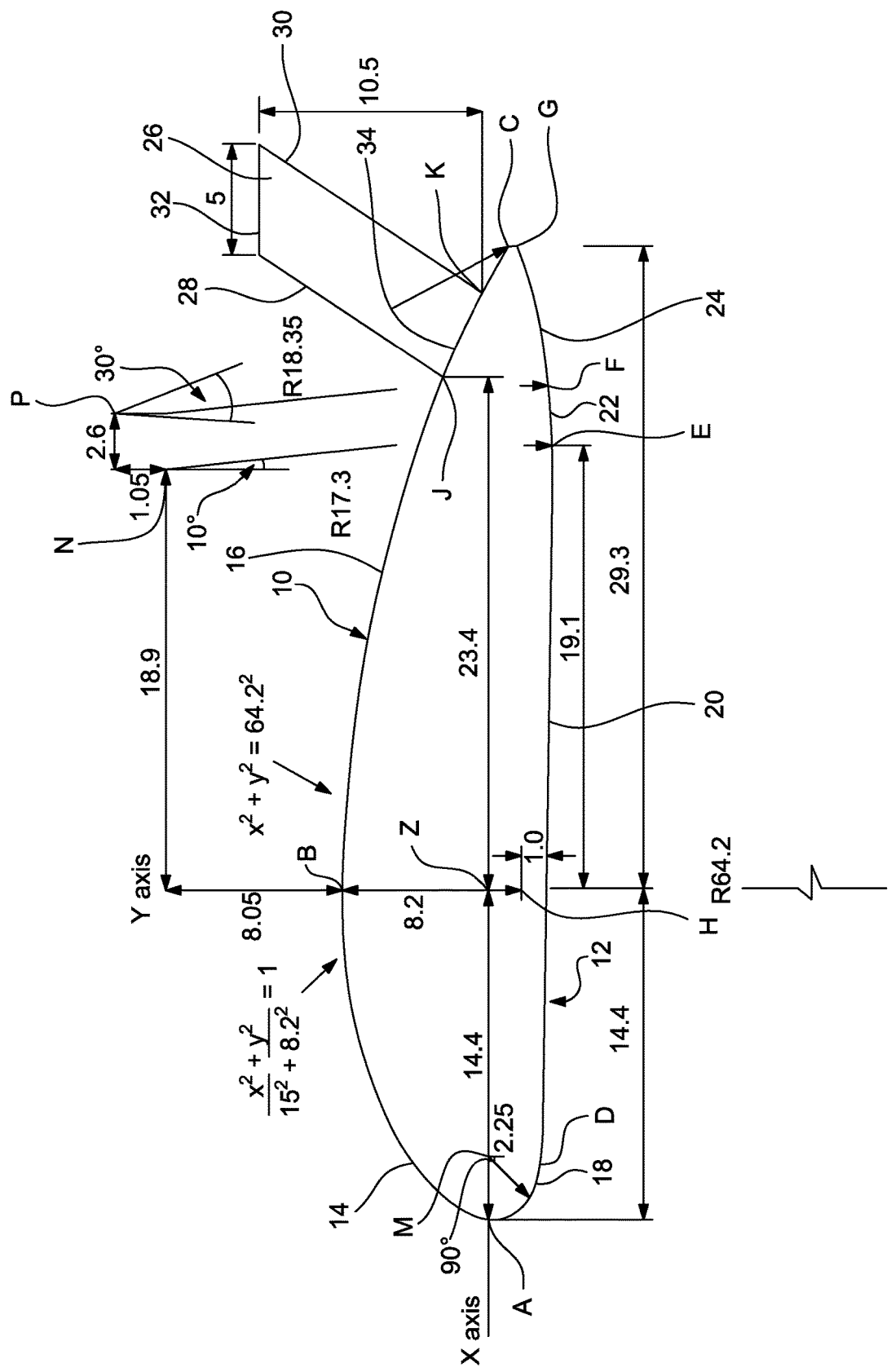
FIG. 1 is a schematic side view of a fuselage profile according to the present invention.
Figure 2:
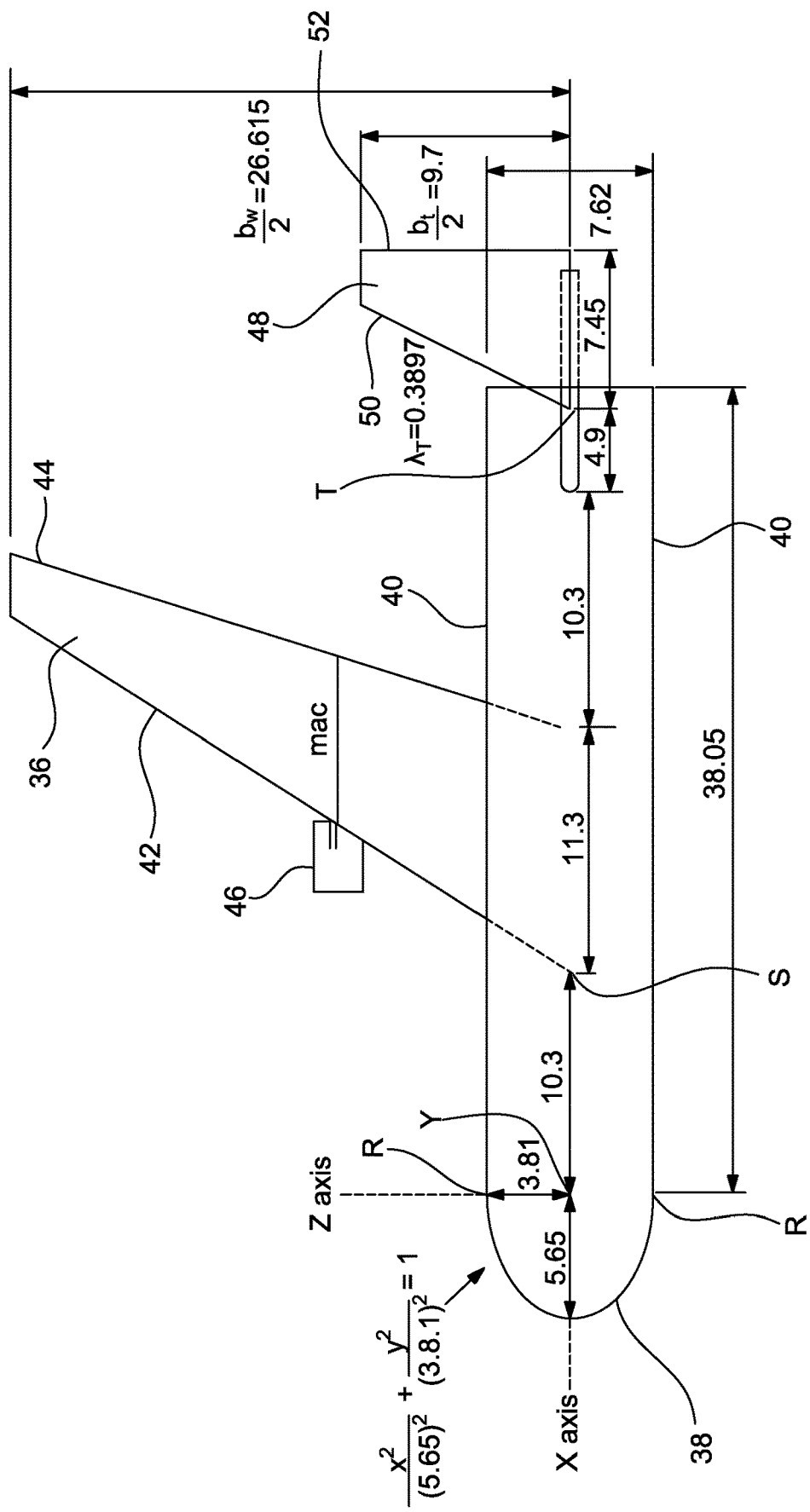
FIG. 2 is a schematic top view of a fuselage profile and wing according to the present invention.

A passenger/freight aircraft having an aerodynamic lifting body fuselage profile that complements the lift of the wings of the aircraft, as shown in FIGS. 1-2. FIG. 1 shows the side profile of the fuselage and vertical tail section of the aircraft. The fuselage profile has an upper surface 10 and a lower surface 12. The profile of the upper surface 10 is generated from the equations of an ellipse and a circle. The profile of the lower surface 12 is generated from the equations of a circle at each end connected by a straight line. The camber of the fuselage profile allows for an increase in pressure differential between upper surface 10 and lower surface 12 of the aircraft fuselage.

The equation for an ellipse is $y=\sqrt{(b^2(1-(x^2/a^2)))}$ and the equation for a circle is $y=\sqrt{(r^2-x^2)}$. The upper surface 10 shown in FIG. 1 is a section 14 of a first ellipse at the front of the fuselage from point A to point B. The profile of the upper surface 10 transitions to a first circle arc 16 from point B to point C. The lower surface 12 is a second circle arc 18 from point A to point D. The profile of the lower surface 12 transitions to straight line 20 from point D to point E. The profile of the lower surface 12 transitions from the straight line 20 to third circle arc 22 from point E to point F and a fourth circle arc 24 from point F to point G.

FIG. 1 shows an example of the fuselage profile in meters, whereby a=15 m and b=8.2 m for the first ellipse and r=64.2 m for the first circle used to form the upper surface 10 of the fuselage profile. Using the profile of the upper surface 10 formed from the first ellipse and first circle, the other circle arcs are formed to provide a matching lower surface 12 to the upper surface 10. The fuselage is 43.7 m in length with a height and width similar to the Airbus A380, thereby giving it the capacity equivalent to a Boeing 787 or Airbus A330. At point Z is an x-y coordinate plane used for measurements with point Z as the origin. Point H is 1.25 m below point Z on the y-axis. The distance from the nose at Point A to Point Z where the first ellipse crosses the x-axis at point A is 14.4 m. The distance from Point H to point B where the first ellipse crosses the y-axis is 8.2 m. Point H is down 1.25 m from point Z and point H is the center of the first ellipse defined by a=15 m and b=8.2 m. The first circle arc 16 is formed by choosing a center of the first circle 64.2 m from point B along the y-axis. 64.2 m is the radius of the first circle, whereby the radius of the first circle is determined by knowing x and y at point B for the ellipse. The equation of a circle proscribes an arc going clockwise from the section 14 of the first ellipse to the tail of the aircraft and subtends an angle of 27 deg. from the y-axis. The center of the circle is 64.2 m below point B on the y-axis. The vertical tail section 26 extending from the upper surface 10 has a front edge 28, a rear edge 30, a top edge 32 and bottom edge 34. The top edge 32 is 5 m in length. The vertical distance between the rear of the top edge 32 and the rear of the bottom edge 34 is 10.5 m. The front edge 28 is at Point J which aligns with 23.4 m along the x-axis from point Z. The rear edge 30 is at point K which aligns with 28.4 m along the x-axis from point Z.

The profile of the lower surface 12 starts at point A with the second circle arc 18. The second circle arc 18 has a radius of 2.25 m and having a center at point M, which 2.25 m from point A along the x-axis. The second circle arc 18 ends at point D and transitions into the straight line 20. In reference to the shape at the front of the aircraft, the profile follows the equation of the first ellipse which begins at the maximum height going counter clockwise and terminates at point A, when the curve is at a horizontal distance of 14.4 m from the from point Z. The second circle arc 18 of ninety degrees is then drawn from section 14 of the first ellipse at point A to the horizontal parallel to the x-axis. The radius of the second circle arc 18 is 2.25 m and has a center at point M, which is 12.15 m horizontally along the x-axis from the point Z. The straight line 20 of the profile of the lower surface 12 is 31.25 m from point D to point E. The third circle arc 22 is a ten degree arc that starts at point E and ends at point F. The radius that forms the third circle arc 22 is 17.3 m. The center of the circle that forms the third circle arc 22 is point N. Point N is located 15 m above the x-axis and 18.9 m from the y-axis. The fourth circle arc 24 is a thirty degree arc that starts at point F and ends at point G. The radius of the circle that forms the fourth circle arc 24 is 18.35 m. The center of the circle that forms the fourth circle arc 24 is point P. Point P is located 16.05 m above the x-axis and 21.5 m from the y-axis. The distance between the y-axis and point, C/G is 29.3 m.

The aircraft is designed to cruise at Mach 0.85 with supercritical wings and a sweep-back angle of 33.5 degrees. $\lambda_w$ is the taper ratio of the wing, where $\lambda_w = c_{tip}/c_{root}$, and where $c_{tip}$ is the chord length at the tip and $c_{root}$ is the cord length at the root. FIG. 2 shows an example of a wing 36 that is compatible with the fuselage profile previously described. FIG. 2 also shows the profile of the fuselage from a top view. The front of the top profile of the fuselage is a section 38 of a second ellipse where a=5.65 m and b=3.81 m. At point Y is an x-z coordinate plane used for measurements, where by Y is the origin of the x-z coordinate plane and where the x-axis and z-axis cross. The x-z coordinate plane is the rotation of the x-y plane shown in FIG. 1, so that the y-axis forms the origin between the x-axis and z axis. The center of the second ellipse is at point Y. The top profile includes two straight lines 40 extending from points R, where the second ellipse transitions to the two straight lines 40 at points R. The distance between the two lines 40 is 7.62 m. FIG. 2 shows a first wing 36 extending from the right side of the fuselage profile. It is envisioned that a second wing of the same characteristics extends from the left side of the fuselage profile and that the wingspan would be the total of both wings. The x-axis forms the center line of the fuselage in the x-z plane. The wing 36 has a leading edge 42 and a trailing edge 44. FIG. 2 shows an engine 46 mounted to the wing at the mean aerodynamic chord (MAC), but the engines of the aircraft could be mounted on other locations of the aircraft. The leading edge 42 of the wing intersects the centerline x-axis 10.3 m from point Y at point S. The root length of the wing between the leading edge 42 and the trailing edge 44 along the centerline x-axis is 11.3 m long. The taper ratio is $\lambda_w$=0.26 The span of the wing from the center line of the fuselage to the wing tip is 26.615 m and is defined by the equation of $b_w/2$, where $b_w$ is the total wingspan of the first and second wing. The total wingspan of the first and second wing is envisioned to be 53.23 m.

FIG. 2 also shows the horizontal tail section 48 mounted to the vertical tail section 26. The horizontal tail section has a leading edge 50 and a trailing edge 52. The leading edge 50 of the horizontal tail section 48 begins 4.9 m from the front edge of the vertical tail section 26 and 31.9 from point Y on the centerline along the x-axis at point T. The taper ratio of the horizontal tail section 48 is $\lambda_T$=0.3897. The root length from the leading edge 50 to the trailing edge 52 of the horizontal tail section 48 is 7.45 m. The span of the horizontal tail section 48 from the center line of the fuselage to the tail tip is 9.7 m and is defined by the equation of $b_T/2$, where $b_T$ is the total span of the horizontal tail section 48. The total span of the horizontal tail section 48 is envisioned to be 19.4 m. Consequently, the combined Airfoil-and-Wing has a high Lift/Drag ratio, and a low Thrust/Weight ratio, resulting in an efficient and environmentally friendly aircraft.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. An aircraft with a lifting body fuselage profile, consisting of:
    a vertical tail section and a nose;
    a fuselage profile having a nose end and tail end and having an upper surface between said nose and said tail end and a lower surface between said nose and said tail end;
    said profile of said upper surface having a section of a first ellipse starting at said nose end and a first circle arc transitioning from said first ellipse section to said tail end;
    said profile of said lower surface having a second circle arc transitioning from said section of said first ellipse of said upper surface at said nose end and transitioning to a straight line, a third circle arc transitioning from said straight line and a fourth circle arc transitioning from said third circle arc and ending at said tail end; and
    wherein said fuselage is 44.3 m in length from said nose end to said tail end, wherein said first ellipse uses a=15 m and b=8.2 m for equation of said first ellipse, wherein said first circle arc has a radius of r=64.2 m and subtends an angle of 27 degrees, wherein said second circle arc has a radius of r=2.25 m and subtends an angle of 90 degrees, wherein said straight line is 31.25 m, wherein said third circle arc has a radius of r=17.3 m and subtends an angle of 10 degrees, and wherein said fourth circle arc has a radius of r=18.35 m and subtends an angle of 30 degrees.

2. The aircraft of claim 1, wherein an x-y coordinate plane is employed for measurement having a point Z as the origin where an x-axis and y-axis cross; wherein a point H is 1.25 m below said point Z on the y-axis; wherein said nose end at a point A is a distance of 14.4 m from said point Z and said section of said first ellipse crosses the x-axis at said point A; wherein there is a point B on said y-axis above said x axis; wherein a distance from said point H to said point B is 8.2 m and said section of said first ellipse crosses the y-axis at said point B; wherein said point H is the center of said first ellipse defined by a=15 m and b=8.2 m, wherein said first circle arc has a center 64.2 m from said point B along said y-axis and below said x-axis; wherein said profile of said lower surface starts at said point A with said second circle arc having a center at a point M 2.25 m from said point A along said x-axis; wherein said straight line starts at a point D where said second circle ends; wherein said straight line ends at a point E that is 31.25 m from said point D; wherein said third circle arc starts at said point E and ends at a point F; wherein a center of a circle that forms said third circle arc is at a point N located 15 m above said x-axis and 18.9 m from said y-axis; wherein said fourth circle arc starts at said point F and ends at a point G; and wherein a center of a circle that forms said third circle arc is at a point P located 16.05 m above said x-axis and 21.5 m from said y-axis.

3. The aircraft of claim 1, wherein said vertical tail section extends from said upper surface, said vertical tail section having a front edge, a rear edge, a top edge and bottom edge, said top edge is 5 m in length, a vertical distance between said rear of said top edge and said rear of said bottom edge being 10.5 m, said front edge and said rear edge intersect said upper surface.

4. The aircraft of claim 2, wherein said vertical tail section extends from said upper surface, said vertical tail section having a front edge, a rear edge, a top edge and bottom edge, said top edge is 5 m in length, a vertical distance between said rear of said top edge and said rear of said bottom edge being 10.5 m, said front edge is at point J on said upper surface which aligns with 23.4 m along said x-axis from said point Z and said rear edge is at a point K on said upper surface which aligns with 28.4 m along said x-axis from said point Z.

5. The aircraft of claim 1, wherein said nose has a top profile defined by a section of a second ellipse, where a=5.65 m and b=3.81 m.

6. The aircraft of claim 2, wherein said nose has a top profile defined by a section of a second ellipse, where a=5.65 m and b=3.81 m; said second ellipse having a center at a point Y which is the origin of an x-z coordinate plane that is the rotation of said x-y plane, so that the y-axis forms the origin between the x-axis and z axis; said section of said second ellipse ending in points R and top profile transitioning into two straight lined such that a distance between said two lines is 7.62 m.

7. An aircraft with a lifting body fuselage profile, consisting of:
   a vertical tail section and a nose;
   a fuselage profile having a nose end and tail end and having an upper surface between said nose and said tail end and a lower surface between said nose and said tail end;
   said profile of said upper surface having a section of a first ellipse starting at said nose end and a first circle arc transitioning from said first ellipse section to said tail end;
   said profile of said lower surface having a second circle arc transitioning from said section of said first ellipse of said upper surface at said nose end and transitioning to a straight line, a third circle arc transitioning from said straight line and a fourth circle arc transitioning from said third circle arc and ending at said tail end;
   wherein said fuselage is 44.3 m in length from said nose end to said tail end, wherein said first ellipse uses a=15 m and b=8.2 m for equation of said first ellipse, wherein said first circle arc has a radius of r=64.2 m and subtends an angle of 27 degrees, wherein said second circle arc has a radius of r=2.25 m and subtends an angle of 90 degrees, wherein said straight line is 31.25 m, wherein said third circle arc has a radius of r=17.3 m and subtends an angle of 10 degrees, and wherein said fourth circle arc has a radius of r=18.35 m and subtends an angle of 30 degrees; and
   a pair of wings, where $\lambda_w$ is the taper ratio of each of said wings; where $\lambda_w = c_{tip}/c_{root}$ and where $c_{tip}$ is a chord length at a wing tip and $c_{root}$ is the chord length at a wing root, wherein each of said wings has a leading edge and a trailing edge, wherein said leading edge of the wing intersects a centerline x-axis 10.3 m from point Y at a point S; wherein a root length of each of said wings between the leading edge and the trailing edge along the centerline x-axis is 11.3 m long; wherein said taper ratio is $\lambda_w=0.26$ and wherein there is a total wingspan of 53.23 m.

8. The aircraft of claim 4, wherein said nose has a top profile defined by a section of a second ellipse, where a=5.65 m and b=3.81 m; said second ellipse having a center at a point Y which is the origin of an x-z coordinate plane that is the rotation of said x-y plane, so that the y-axis forms the origin between the x-axis and z axis; said section of said second ellipse ending in points R and top profile transitioning into two straight lines such that a distance between said two lines is 7.62 m.

9. An aircraft with a lifting body fuselage profile, consisting of:
   a vertical tail section and a nose;
   a fuselage profile having a nose end and tail end and having an upper surface between said nose and said tail end and a lower surface between said nose and said tail end;
   said profile of said upper surface having a section of a first ellipse starting at said nose end and a first circle arc transitioning from said first ellipse section to said tail end;
   said profile of said lower surface having a second circle arc transitioning from said section of said first ellipse of said upper surface at said nose end and transitioning to a straight line, a third circle arc transitioning from said straight line and a fourth circle arc transitioning from said third circle arc and ending at said tail end;
   wherein said fuselage is 44.3 m in length from said nose end to said tail end, wherein said first ellipse uses a=15 m and b=8.2 m for equation of said first ellipse, wherein said first circle arc has a radius of r=64.2 m and subtends an angle of 27 degrees, wherein said second circle arc has a radius of r=2.25 m and subtends an angle of 90 degrees, wherein said straight line is 31.25 m, wherein said third circle arc has a radius of r=17.3 m and subtends an angle of 10 degrees, and wherein said fourth circle arc has a radius of r=18.35 m and subtends an angle of 30 degrees; and
   a horizontal tail section having a leading edge and a trailing edge; wherein said leading edge of said horizontal tail section begins 4.9 m from said front edge of said vertical tail section and 31.9 from said point Y on the centerline along said x-axis at a point T; said horizontal tail section having a taper ratio of $\lambda_T=0.3897$; said horizontal tail section having a root length from said leading edge to said trailing edge of 7.45 m; said horizontal tail section having a center line of said fuselage to a horizontal tail section tip of 9.7 m.

* * * * *